US009323864B2

(12) United States Patent
Bornea et al.

(10) Patent No.: US 9,323,864 B2
(45) Date of Patent: Apr. 26, 2016

(54) METHOD AND APPARATUS FOR IDENTIFYING THE OPTIMAL SCHEMA TO STORE GRAPH DATA IN A RELATIONAL STORE

(71) Applicant: International Business Machines Corporation, Armonk, NY (US)

(72) Inventors: Mihaela Ancuta Bornea, White Plains, NY (US); Julian Timothy Dolby, Bronx, NY (US); Achille Belly Fokoue-Nkoutche, White Plains, NY (US); Anastasios Kementsietsidis, New York, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/967,031

(22) Filed: Aug. 14, 2013

(65) Prior Publication Data
US 2015/0052175 A1 Feb. 19, 2015

(51) Int. Cl.
*G06F 17/30* (2006.01)
(52) U.S. Cl.
CPC .... *G06F 17/30958* (2013.01); *G06F 17/30292* (2013.01)
(58) Field of Classification Search
CPC ................................. G06F 17/30292
USPC ........................................ 707/798
See application file for complete search history.

(56) References Cited

U.S. PATENT DOCUMENTS

| 8,417,715 | B1 | 4/2013 | Bruckhaus et al. |
| 2008/0172598 | A1 | 7/2008 | Jacobsen et al. |
| 2009/0319515 | A1 | 12/2009 | Minton et al. |
| 2010/0318370 | A1 | 12/2010 | Bhattacharyya et al. |
| 2012/0060142 | A1 | 3/2012 | Fliess et al. |
| 2013/0282765 | A1* | 10/2013 | Bhattacharjee et al. ...... 707/803 |

FOREIGN PATENT DOCUMENTS

EP    2474917 A    7/2012

OTHER PUBLICATIONS

Deutsch et al., "Storing Semistructured Data with STORED," SIGMOD '99 Proceedings of the 1999 ACM SIGMOD international conference on Management of data.

(Continued)

*Primary Examiner* — Etienne Leroux
*Assistant Examiner* — Cindy Nguyen
(74) *Attorney, Agent, or Firm* — George Willinghan

(57) ABSTRACT

A system for identifying a schema for storing graph data includes a database containing a graph dataset of data and relationships between data pairs and a list of storage methods that each are a distinct structural arrangement of the data and relationships from the graph data set. An analyzer module collects statistics for the graph dataset, and a data classification module uses the collected statistics to calculate metrics describing the data and relationships in the graph dataset, uses the calculated metrics to group the data and relationships into a plurality of graph dataset subsets and. associates each graph dataset subset with one of the plurality of storage methods. The resulting group of storage methods associated with the plurality of graph dataset subsets includes a unique storage method for each graph dataset subset. The data and relationships in each graph dataset subset are arranged in accordance with associated storage methods.

20 Claims, 2 Drawing Sheets

(56) References Cited

OTHER PUBLICATIONS

Dinu et al., "Guidelines for the Effective Use of Entity-Attribute-Value Modeling for Biomedical Databases," International journal of medical informatics 76.1-12 (2007) 769.

Grun, "Storing and Querying Large XML Instances,". Diss. PhD Thesis. University of Konstanz (Jan. 2011) ISBN: 978-3838124599, 2011.

Wade et al., "A Dimensional Bus model for integrating clinical and research data," Journal of the American Medical Informatics Association 18.Suppl 1 (2011): i96-i102.

Wang, "Application Research of Data Warehousing Technology in Library Decision Support System," The 2nd IEEE International Conference on Information Management and Engineering (ICIME), 2010.

* cited by examiner

METHOD AND APPARATUS FOR IDENTIFYING THE OPTIMAL SCHEMA TO STORE GRAPH DATA IN A RELATIONAL STORE

FIELD OF THE INVENTION

The present invention relates to data management and data linking.

BACKGROUND OF THE INVENTION

Attempts to shred graph data, for example, resource description framework (RDF) data into the relational model include a single triple-store relation with three columns, one each for the subject, predicate and object. Therefore, each RDF triple becomes a single tuple, which for a popular dataset like DBpedia results in a relation with 333M tuples, one per RDF triple. The triple-store can deal with dynamic schemas since triples can be inserted without a priori knowledge of RDF data types. However, efficient querying requires specialized techniques and is rather inefficient. Another alternative is a type-oriented approach where one relation is created for each RDF data type. So, for a dataset like DBpedia, one relation is created for people and another relation for companies. Dynamic schemas require schema changes as new RDF types are encountered, and the number of relations can grow quickly considering that DBpedia includes 150K types. A third alternative considers a predicate-oriented approach centered around column-stores where a binary subject-object relation is created for each predicate. So, in DBpedia one relation is created for the born predicate, one for the died predicate, etc. Similar to the type-oriented approach, dynamic schemas are problematic as new predicates result in new relations, and in a dataset like DBpedia these can number in the thousands. Finally, a fourth entity-oriented alternative avoids both the skinny relation of the first approach and the schema changes and thousands of relations required by the latter two.

While alternatives exist, no one alternative is consistently better or consistently outperforms all the other alternatives in every situation. There are cases where even the single-triple store might be useful as a storage medium, while other times column-stores might significantly improve query evaluation. Entity-oriented stores prove advantageous in star-queries, but are less effective in highly selective queries. All of the existing solutions in storing RDF data in relational stores are static in that they fix their RDF representation to one of these alternatives and therefore lose some of the benefits found in the others.

SUMMARY OF THE INVENTION

Exemplary embodiments of systems and methods in accordance with the present invention take advantage of and employ all appropriate current and future relational representations of RDF into a single graph store. An RDF, or in general a graph, dataset that is to be loaded or is already loaded in an RDF store is considered and analyzed. Based on this analysis, representations that are appropriate for specific parts of the dataset are chosen. Instead of loading the whole RDF dataset into a single representation, as is done in conventional systems, the RDF input data are decomposed into, for example, person data and company data. The person data are more appropriately loaded in the entity-oriented store, and the company data are more appropriately loaded in a column-like store. In addition to the division of data to the various representations based on type, the data can be divided based on the predicates. Furthermore, data might be duplicated and stored at the same time into different configurations, i.e., in both a column-store and a type-oriented store depending on data cardinalities, predicate selectivities and type characteristics among other considerations.

An advantage of finding the right representation for the right type of data is an improvement in query performance. Systems and methods in accordance with the present invention achieve orders of magnitude improvements in evaluation time. An example test was run analyzing and determining the right representation for SP2B (a benchmark dataset). The running times from benchmark queries were compared when storing the dataset in the most optimal state-of-the-art solution for this dataset (in this case the entity-oriented approach) and when storing the dataset in a representation in accordance with the present invention that more closely fits the data. The query running times are illustrated in

TABLE I

As can be seen, for some of the queries there are 2-3 orders of magnitude improvements in evaluation times, with all the queries improving by at least 50%.

| | Query Time (sec) | |
|---|---|---|
| Query | Multiple Representations | Single Optimal Representation |
| Q1 | 0.0004 | 0.0006 |
| Q2 | 46.6 | 361 |
| Q3a | 2.7 | 28 |
| Q3b | 0.02 | 19 |
| Q3c | 0.002 | 14.94 |
| Q5a | 162.22 | 567 |
| Q5b | 94 | 493 |
| Q9 | 122 | 400 |
| Q10 | 0.001 | 0.003 |
| Q11 | 22 | 49 |

DETAILED DESCRIPTION

Exemplary embodiments in accordance with the present invention provide for the organization of graph datasets such as resource description framework (RDF) datasets that are used, for example, in the Semantic Web in order to improve, among other things, the processing of queries over these graph datasets, the storage overhead in terms of space, the storage access patterns and speed, and even the system memory consumption. Improvements in the processing of queries minimize the time required to process these queries and optimize the use of resources, i.e., computing and network resources, in processing these queries. The organization, i.e., storing or shredding, of the graph data is structured in accordance with statistics describing the content, i.e., values of subjects, predicates (properties) and objects, and organization of the RDF datasets in order to improve the processing of queries over the RDF datasets. In particular, the content of the graph data, i.e., the data or data values and relationships, in multiple distinct schemas for a single RDF dataset or into a plurality of distinct dimensions, i.e., blocks of tuples, based on a common object, subject or predicate value.

Figure 1:
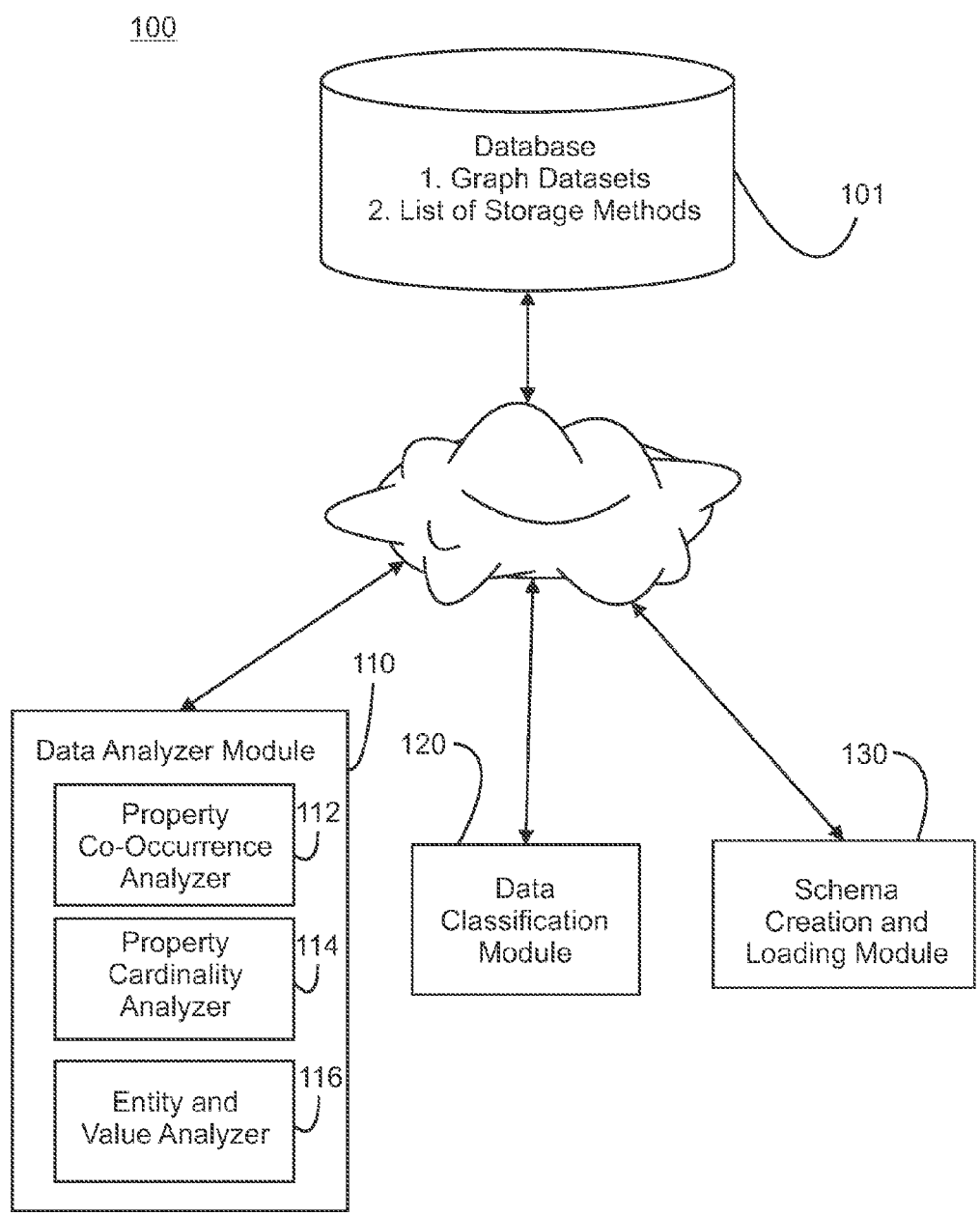
FIG. 1 is a schematic illustration of an embodiment of a system for identifying a schema for storing graph data in a relational store in accordance with the present invention.

Referring initially to FIG. 1, an exemplary embodiment of a system for use in identifying a schema for storing graph data in a relational store 100 in accordance with the present invention is illustrated. The system includes one or more databases 101. Suitable databases are known and available in the art and can be disposed in one or more computing systems including distributed computing systems. Stored on the database is at least one a graph dataset. These graphs datasets include RDF datasets that are used, for example, in the Semantic Web. RDF datasets in particular and graph datasets in general include data arranged in a plurality of nodes and relationships between data pairs illustrated as a plurality of edges between pairs of nodes. These arrangements of nodes and relationships form the "graph" or structure of the graph datasets. In RDF datasets, the nodes represent subjects and objects and the relationships are the predicates or properties that connect subjects to objects. Any arrangement of the content of the subject and object nodes and predicates in a given RDF graph as known to and understood by one of skill in the art can be used in the graph datasets of the present invention. As the graph datasets contain a plurality of tuples or subject-predict-object triples, the content of a graph data set can also be represented in a column and row delineated structure. The present invention takes advantage of the various options for representing the data and relationships in each graph dataset.

Therefore, database also includes a schema list that contains a plurality of storage methods for the data and relationship tuples of a given graph dataset. Each storage method is a distinct structural arrangement of the data and relationships from the graph data set. Suitable storage methods include, but are not limited to, a triple-store storage method, a property cluster storage method, a property class storage method, a vertically partitioned column storage method and an entity oriented storage method. In the triple-store, the data and relationships are arranged in a triples in a, each triple occupying a row in a table having three columns. In the property cluster storage method binary data groupings, i.e., subjects and objects, are clustered in a table. The property class storage method breaks the table into a plurality of tables by property class. The vertically partitioned column storage method has a separate two column (binary) for each unique property of relationship. A different row is provided for each subject. In the entity oriented storage method, a plurality binary relationship and data value groupings are associated with a given data value row in a table. For RDF, a given subject has a row and a plurality of predicate and object binary groupings in the row.

The system includes a data analyzer module 110 executing on a computing system. This module, as well as all other modules and databases are in communication with each other across one or more local or wide are networks. The modules and databases can also be contained in a distributed computing system, a single domain, across multiple domains or within a single computing system, computer or server. The data analyzer module collects statistics for each graph dataset that is to be stored in accordance with the improved schemas of the present invention. These statistics, e.g., content and organization, of the graphs datasets include an identification of the content or value of each individual node in the graph dataset, an identification of all relationships associated with edges in the graph dataset and associations among data and relationships as indicated by the structure of the nodes and edges in the graph dataset. Therefore, a list or set of all data values, e.g., subject and objects, and relationships, e.g, predicates is generated as well as a frequency or count of those data values and relationships. The structure among the data and relationships is also determined. In order to perform these functions, the data analyzer module includes a relationship co-occurrence analyzer 112, a relationship cardinality analyzer 114 and an entity and data value analyzer 116.

The system includes a data classification module 120 that is executing on the computing system and that receives the collected statistics from the data analyzer module. The data classification module uses these collected statistics to calculate metrics describing the data and relationships in the graph dataset. Suitable metrics include, but are not limited to, co-occurrences of relationships linking data associated with a given entity, co-occurrences of relationships linking data of a given type, selectivity of a given relationship, number of distinct data values associated with a given relationship, an identification of single-valued relationships and multi-valued relationships and selectiveness of given data values by relationship. The data classification module uses the calculated metrics to group the data and relationships into a plurality of graph dataset subsets. Each graph dataset subset contains at least a portion of the data and relationships in the graph dataset. A given data value, i.e., subject or object, relationship, i.e., predicate or tuples of data and relationships, i.e., subject-predicate-object triple, can be located in more than one subset as it may have metrics that allow it to be associated with different data and relationship groupings. The data classification module associates each graph dataset subset with one of the plurality of storage methods based on the metrics associated with that subset. At least two different storage methods are associated with two different graph dataset subsets. Therefore, the resulting storage schema is heterogeneous across all subsets. In one embodiment, the group of storage methods associated with the plurality of graph dataset subsets includes a unique storage method for each graph dataset subset.

The system includes a schema creation and loading module 130 that is executing on the computing system. This schema creation and loading module arranges the data and relationships in each graph dataset subset in accordance with its associated storage method to create the schema for the graph dataset. This provides the desired improve storage schema of the present invention that is used to process queries over the graph dataset in faster and more efficiently.

This system is used in methods in accordance with the present invention to store graph datasets in relational stores. Initially, the input graph dataset is analyzed, and a plurality of metrics are computed for the input graph dataset. These metrics include, but are not limited to, co-occurrences of predicates in the various types and entities, selectivities of predicates and numbers of distinct values in them, selectivities of object values per predicates and whether predicates are single-valued or multi-valued. Based on the computed metrics, a decision is made regarding how various groupings of the plurality of triples are stored. For example, a multi-valued attribute is stored in a column-store representation, while single-valued attributes are stored together in an entity-oriented store. In addition, certain triples relating to particular predicates are stored in a triple-store.

Figure 2:
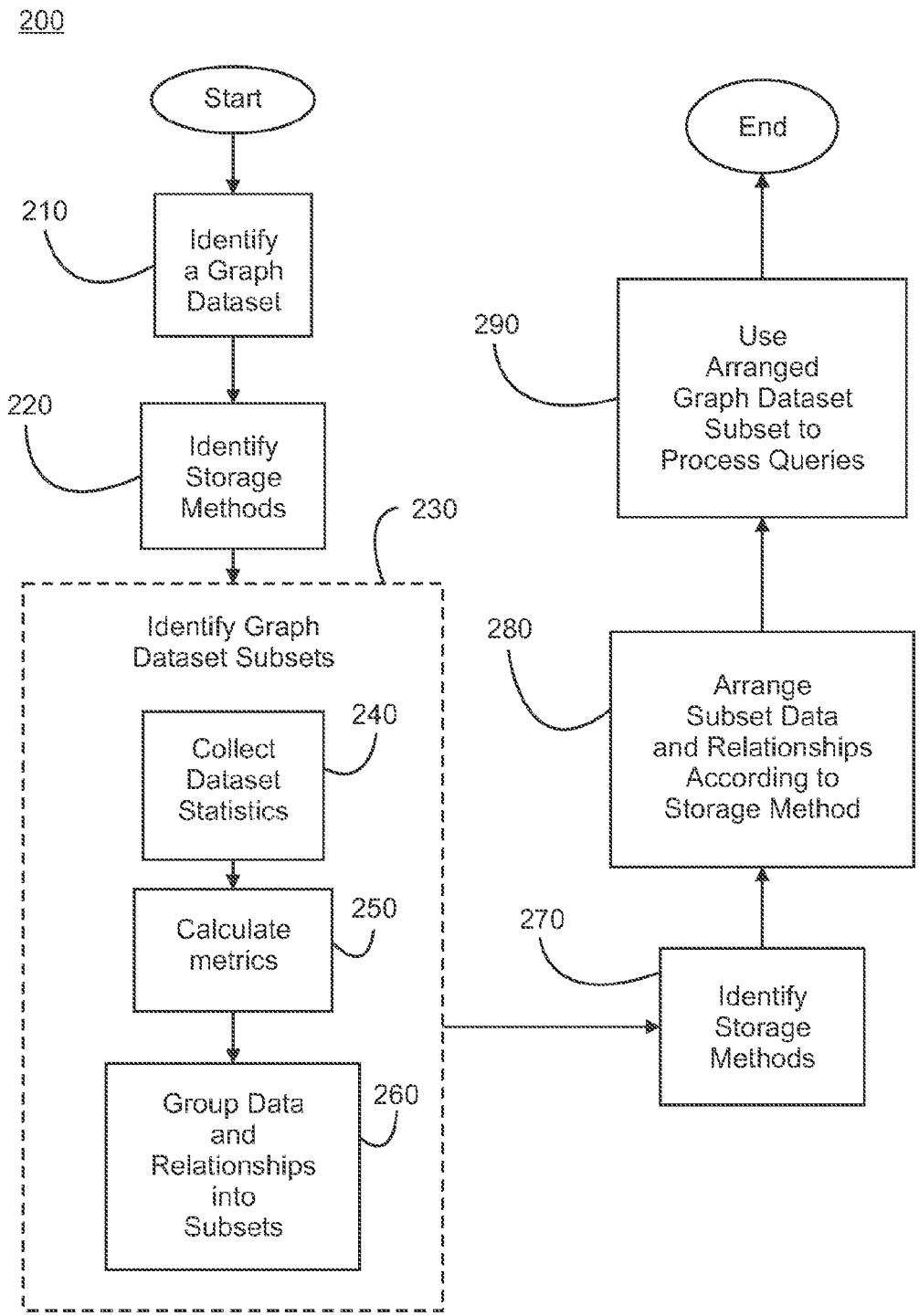
FIG. 2 is a flow chart illustrating an embodiment of a method for identifying a schema for storing graph data in a relational store in accordance with the present invention.

Referring to FIG. 2, the exemplary embodiments in accordance with the present invention are also directed to a method for identifying a schema for storing graph data in a relational store 200. A graph dataset containing data arranged in a plurality of nodes and relationships between data pairs illustrated as a plurality of edges between pairs of nodes is identified 210. Preferably, the graph dataset is a resource description framework dataset having a plurality of subjects and a plurality of objects. Each subject and each object represents a distinct node in the RDF graph. These nodes are connected by a plurality of predicates expressing relationships between subject and object pairs. Each predicate represents one or more edges in the RDF graph.

A plurality of storage methods are also identified 220. Each storage method represents a distinct structural arrangement of the data and relationships from the graph data set. Suitable storage methods include, but are not limited to, a triple-store storage method, a property cluster storage method, a property class storage method, a vertically partitioned column storage method and an entity oriented storage method. A plurality of graph dataset subsets from the graph dataset are identified 230. Each graph dataset subset includes at least a portion of the data and relationships in the graph dataset, e.g., one or more subject-predicate-object triples. In one embodiment, in order to identifying the plurality of graph dataset subsets, statistics for the graph dataset are collected 240. These statistics includes an identification of the content, e.g., value, of each individual node in the graph dataset, an identification of all relationships associated with edges in the graph dataset and associations among data and relationships as indicated by the structure of the nodes and edges in the graph dataset. The collected statistics are used to calculate metrics 250 describing the data and relationships in the graph dataset. Suitable metrics include, but are not limited to co-occurrences of relationships linking data associated with a given entity, co-occurrences of relationships linking data of a given type, selectivity of a given relationship, number of distinct data values associated with a given relationship, an identification of single-valued relationships and multi-valued relationships and selectiveness of given data values by relationship.

The calculated metrics are used to group the data and relationships into the plurality of graph dataset subsets 260. One or more data values and one or more relationships are contained in more than one graph dataset subsets. Therefore, data and relationships, e.g., subject-predicate-object triples, do not have to be in a single subset. A storage method, from the plurality of storage methods, for each graph dataset subset is identified 270 such that the storage method provides the structural arrangement for the data and relationships in each graph dataset subset that minimizes a processing time for queries over each graph dataset subset. Therefore, each graph dataset subset is associated with one of the plurality of storage methods. This defines a group of storage methods for the plurality of subsets. The group of storage methods associated with the plurality of graph dataset subsets includes at least two separate storage methods. In one embodiment, the group of storage methods associated with the plurality of graph dataset subsets includes a unique storage method for each graph dataset subset. The data and relationships in each graph dataset subset are arranged in accordance with its associated storage method 280. The yields the overall schema for the graph dataset. The plurality of graph datasets arranged in accordance with the associated storage methods are used to process queries over the graph dataset 290.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for identifying a schema for storing graph data in a relational store in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for identifying a schema for storing graph data in a relational store, the method comprising:

identifying in a database a graph dataset comprising data arranged in a plurality of nodes and relationships between data pairs illustrated as a plurality of edges between pairs of nodes;

identifying a plurality of storage methods, each storage method comprising a distinct structural arrangement of the data and relationships from the graph data set;

identifying a plurality of graph dataset subsets, each graph dataset subset comprising at least a portion of the data and relationships in the graph dataset;

associating each graph dataset subset with one of the plurality of storage methods, wherein a group of storage methods associated with the plurality of graph dataset subsets includes at least two separate storage methods; and arranging the data and relationships in each graph dataset subset in accordance with its associated storage method to create the schema for the graph dataset in the database.

2. The method of claim 1, wherein the graph dataset comprises a resource description framework dataset comprising:
   a plurality of subjects and a plurality of objects, each subject and each object comprising a distinct node; and
   a plurality of predicates expressing relationships between subject and object pairs, each predicate comprising one or more edges.

3. The method of claim 1, wherein the plurality of storage methods comprise a triple-store storage method, a property cluster storage method, a property class storage method, a vertically partitioned column storage method or an entity oriented storage method.

4. The method of claim 1, wherein identifying the plurality of graph dataset subsets further comprises:
   collecting statistics for the graph dataset, the statistics comprising an identification of the content of each individual node in the graph dataset, an identification of all relationships associated with edges in the graph dataset and associations among data and relationships as indicated by the structure of the nodes and edges in the graph dataset;
   using the collected statistics to calculate metrics describing the data and relationships in the graph dataset; and
   using the calculated metrics to group the data and relationships into the plurality of graph dataset subsets.

5. The method of claim 4, wherein the metrics comprise co-occurrences of relationships linking data associated with a given entity, co-occurrences of relationships linking data of a given type, selectivity of a given relationship, number of distinct data values associated with a given relationship, an identification of single-valued relationships and multi-valued relationships or selectiveness of given data values by relationship.

6. The method claim 4, wherein the method further comprises identifying a storage method for each graph dataset subset to provide the structural arrangement for the data and relationships in each graph dataset subset that minimizes a processing time for queries over each graph dataset subset.

7. The method of claim 1, wherein one or more data values and one or more relationships are contained in more than one graph dataset subsets.

8. The method of claim 1, wherein the group of storage methods associated with the plurality of graph dataset subsets comprises a unique storage method for each graph dataset subset.

9. The method of claim 1, further comprising using the plurality of graph datasets arranged in accordance with the associated storage methods to process queries over the graph dataset.

10. A non-transitory computer-readable storage medium containing a computer-readable code that when read by a computer causes the computer to perform a method for identifying a schema for storing graph data in a relational store, the method comprising:
    identifying a graph dataset comprising data arranged in a plurality of nodes and relationships between data pairs illustrated as a plurality of edges between pairs of nodes;
    identifying a plurality of storage methods, each storage method comprising a distinct structural arrangement of the data and relationships from the graph data set;
    identifying a plurality of graph dataset subsets, each graph dataset subset comprising at least a portion of the data and relationships in the graph dataset;
    associating each graph dataset subset with one of the plurality of storage methods, wherein a group of storage methods associated with the plurality of graph dataset subsets includes at least two separate storage methods; and
    arranging the data and relationships in each graph dataset subset in accordance with its associated storage method to create the schema for the graph dataset.

11. The non-transitory computer-readable storage medium of claim 10, wherein the graph dataset comprises a resource description framework dataset comprising:
    a plurality of subjects and a plurality of objects, each subject and each object comprising a distinct node; and
    a plurality of predicates expressing relationships between subject and object pairs, each predicate comprising one or more edges.

12. The non-transitory computer-readable storage medium of claim 10, wherein the plurality of storage methods comprise a triple-store storage method, a property cluster storage method, a property class storage method, a vertically partitioned column storage method or an entity oriented storage method.

13. The non-transitory computer-readable storage medium of claim 10, wherein identifying the plurality of graph dataset subsets further comprises:
    collecting statistics for the graph dataset, the statistics comprising an identification of the content of each individual node in the graph dataset, an identification of all relationships associated with edges in the graph dataset and associations among data and relationships as indicated by the structure of the nodes and edges in the graph dataset;
    using the collected statistics to calculate metrics describing the data and relationships in the graph dataset; and
    using the calculated metrics to group the data and relationships into the plurality of graph dataset subsets.

14. The non-transitory computer-readable storage medium of claim 13, wherein the metrics comprise co-occurrences of relationships linking data associated with a given entity, co-occurrences of relationships linking data of a given type, selectivity of a given relationship, number of distinct data values associated with a given relationship, an identification of single-valued relationships and multi-valued relationships or selectiveness of given data values by relationship.

15. The non-transitory computer-readable storage medium of claim 13, wherein the method further comprises identifying a storage method for each graph dataset subset to provide the structural arrangement for the data and relationships in each graph dataset subset that minimizes a processing time for queries over each graph dataset subset.

16. The non-transitory computer-readable storage medium of claim 10, wherein one or more data values and one or more relationships are contained in more than one graph dataset subsets.

17. The non-transitory computer-readable storage medium of claim 10, wherein the group of storage methods associated with the plurality of graph dataset subsets comprises a unique storage method for each graph dataset subset.

18. The non-transitory computer-readable storage medium of claim 10, further comprising using the plurality of graph datasets arranged in accordance with the associated storage methods to process queries over the graph dataset.

19. A system for identifying a schema for storing graph data in a relational store, the system comprising:

a database comprising:

at least one a graph dataset, each graph dataset comprising data arranged in a plurality of nodes and relationships between data pairs illustrated as a plurality of edges between pairs of nodes; and a schema list comprising a plurality of storage methods, each storage method comprising a distinct structural arrangement of the data and relationships from the graph data set;

an analyzer module executed by a processor on a computing system and in communication with the database, the data analyzer module configured to collect statistics for the graph dataset, the statistics comprising an identification of the content of each individual node in the graph dataset, an identification of all relationships associated with edges in the graph dataset and associations among data and relationships as indicated by the structure of the nodes and edges in the graph dataset;

a data classification module executing on the computing system, in communication with the database and configured to:

use the collected statistics to calculate metrics describing the data and relationships in the graph dataset; and use the calculated metrics to group the data and relationships into a plurality of graph dataset subsets, each graph dataset subset comprising at least a portion of the data and relationships in the graph dataset; and associate each graph dataset subset with one of the plurality of storage methods, wherein a group of storage methods associated with the plurality of graph dataset subsets includes a unique storage method for each graph dataset subset; and a schema creation and loading module executing on the computing system and configured to arrange the data and relationships in each graph dataset subset in accordance with its associated storage method to create the schema for the graph dataset.

20. The system of claim 19, wherein the analyzer module comprises a relationship co-occurrence analyzer, a relationship cardinality analyzer and an entity and data value analyzer.

* * * * *